(12) United States Patent
Kuijpers et al.

(10) Patent No.: US 12,680,059 B2
(45) Date of Patent: Jul. 14, 2026

(54) LOW ALCOHOL BEER COMPRISING A GLUCONATE COMPONENT

(71) Applicant: Heineken Supply Chain B.V., Zoeterwoude (NL)

(72) Inventors: Niels Gerard Adriaan Kuijpers, Zoeterwoude (NL); Tom Daniël Elink Schuurman, Zoeterwoude (NL)

(73) Assignee: HEINEKEN SUPPLY CHAIN B.V., Zoeterwoude (NL)

( * ) Notice: Subject to any disclaimer, the term of this patent is extended or adjusted under 35 U.S.C. 154(b) by 517 days.

(21) Appl. No.: 18/122,596

(22) Filed: Mar. 16, 2023

(65) Prior Publication Data

US 2023/0220318 A1 Jul. 13, 2023

Related U.S. Application Data

(63) Continuation of application No. PCT/EP2021/075726, filed on Sep. 17, 2021.

(30) Foreign Application Priority Data

Sep. 18, 2020 (EP) ..................................... 20196924
Mar. 18, 2021 (EP) ..................................... 21163360

(51) Int. Cl.
C12C 12/04 (2006.01)
C12C 7/20 (2006.01)
C12C 11/00 (2006.01)
C12C 12/00 (2006.01)

(52) U.S. Cl.
CPC ................ C12C 12/04 (2013.01); C12C 7/20 (2013.01); C12C 11/003 (2013.01); C12C 12/002 (2013.01); *C12C 2200/01* (2013.01)

(58) Field of Classification Search
CPC ...................................................... C12C 12/04
See application file for complete search history.

(56) References Cited

U.S. PATENT DOCUMENTS

| | | | |
|---|---|---|---|
| 9,345,260 B2 * | 5/2016 | Berberich | ............... A23L 2/385 |
| 2007/0116801 A1 | 5/2007 | Kowalczyk et al. | |
| 2020/0063079 A1 | 2/2020 | Bystrom-Williams et al. | |

FOREIGN PATENT DOCUMENTS

| | | | | |
|---|---|---|---|---|
| DE | 19756897 A1 | 6/1999 | | |
| EP | 0930359 A2 * | 7/1999 | ............ | C12G 3/025 |
| JP | 2011-217706 A | 11/2011 | | |
| JP | 2012-239460 A | 12/2012 | | |
| WO | WO-98/43489 A1 | 10/1998 | | |
| WO | WO-2014/000746 A1 | 1/2014 | | |
| WO | WO-2018110278 A1 * | 6/2018 | ............... | A23L 2/00 |

OTHER PUBLICATIONS

EP 0930359-A2—WIPO English Translation of Description (Year: 1999).*
Noda et al. (WO 2018110278—Clarivate Analytics translation) (Year: 2018).*
Database GNPD [Online] MINTEL; Nov. 3, 2016, anonymous: "Red Apple Energy Non-Alcoholic Beer", XP055780203, Database accession No. 4395545 (3 pages).
International Preliminary Report on Patentability (Chapter II) issued in PCT Appl. Ser. No. PCT/EP2021/075726 dated Dec. 14, 2022 (14 pages).
International Search Report and Written Opinion on PCT Appl. Ser. No. PCT/EP2021/075726 dated Jan. 7, 2022 (12 pages).

* cited by examiner

*Primary Examiner* — Elizabeth Gwartney

(74) *Attorney, Agent, or Firm* — Sunit Talapatra; Foley & Lardner LLP

(57) ABSTRACT

The invention relates to a method of preparing a beer having an ethanol content of 0-3.0% ABV, in situ fermentative production of gluconate component selected from gluconic acid, gluconate, glucono delta-lactone and combinations thereof by: (a) subjecting the boiled wort to two successive fermentation steps, starting with a fermentation step that generates the gluconate component, followed by the yeast fermentation; or (b) subjecting a first boiled wort to yeast fermentation to produce the yeast fermented wort; subjecting a second boiled wort to another fermentation step to generate the gluconate component and to produce a second fermented wort; and combining the yeast fermented wort and the second fermented wort. Also disclosed is a beer having an ethanol content of 0-3.0% ABV, and produced by the method.

7 Claims, No Drawings

LOW ALCOHOL BEER COMPRISING A GLUCONATE COMPONENT

CROSS-REFERENCE TO RELATED APPLICATIONS

This application is a continuation of International Patent Application No. PCT/EP2021/075726 filed Sep. 17, 2021, which application claims priority to European Patent Application No. 20196924.3 filed Sep. 18, 2020, and to European Patent Application No. 21163360.7 filed Mar. 18, 2021, the contents of which are all incorporated herein by reference in their entireties.

TECHNICAL FIELD OF THE INVENTION

The present invention relates to a method of preparing a beer having an ethanol content of 0-3.0% ABV, said method comprising in situ fermentative production of gluconate component selected from gluconic acid, gluconate, glucono delta-lactone and combinations thereof;

The invention further provides a low alcohol beer having an ethanol content of 0-3.0% ABV, said low alcohol beer comprising 0.5-100 mmol/L of gluconate component selected from gluconic acid, gluconate, glucono delta-lactone and combinations thereof.

BACKGROUND OF THE INVENTION

Beer is a universally popular beverage, consumed worldwide. Beer is commonly produced by a process that comprises the following basic steps:

mashing a mixture of grains and water to produce a mash;
  separating the mash into wort and spent grains;
  boiling the wort, optionally in the presence of added hops or hop extract, to produce a boiled wort;
  fermenting the boiled wort with live yeast to produce a fermented wort;
  subjecting the fermented wort to one or more further process steps (e.g. maturation and filtration) to produce beer; and
  packaging the beer in a sealed container, e.g. a bottle, can or keg.

In recent years, the beer market has witnessed a significant increase in the consumption of low alcohol and alcohol-free beer. This increase is triggered by concerns about health, and is expedited by innovations that have substantially improved the quality of non-alcoholic beers.

Low alcohol beers, including non-alcoholic beers, can be produced by a classical brewing process followed by alcohol removal ("de-alcoholization") by techniques such as vacuum distillation, reverse osmosis, dialysis or evaporation. Alternatively, these low alcohol beers may be produced by manipulating the mashing conditions and/or the fermentation conditions in such a way as to minimize or prevent the formation of ethanol.

Gluconic acid is an organic compound with condensed structural formula $HOCH_2(CHOH)_4COOH$. Gluconic acid, gluconate salts, and gluconate esters occur naturally in, for instance, fruits and honey. Gluconic acid is an oxidation product of D-glucose.

WO 98/043489 describes a non-fermenting Kombucha-containing health food product, said product having an alcohol content of less than 1.5% and a content of sugars selected from the group consisting of fructose, glucose, sucrose and mixtures thereof of at least 0.25%. Table 1 describes a beverage containing 7.56% fructose, 9.47% glucose, 0.082% sucrose, 0.3% alcohol and 2.74% gluconic acid.

US 2020/0063079 describes a method for preparing a kombucha-based alcoholic beverage comprising:

preparing a first tea solution, including steeping tea in a quantity of hot water to form a tea liquor, straining the tea from the tea liquor, and cooling the tea liquor/sugar mixture;
  preparing a primary brew in a first anaerobic fermenter using the first tea solution as an anaerobic nutrient solution, including aerating the first tea solution, adding anaerobic fermentation yeast to the first tea solution, adding sugar to the first tea solution, and anaerobically fermenting the first tea solution to form a primary brew,
  transferring the primary brew from the first anaerobic fermenter to a second anaerobic fermenter to allow removal of yeast particulate formed during primary fermentation;
  preparing a secondary brew in the second anaerobic fermenter, including anaerobically fermenting the anaerobic formation yeast remaining in the primary brew to form a secondary brew having an elevated alcohol by volume (ABV);
  preparing a second fermented tea solution, including steeping tea in a quantity of hot water to form a second tea liquor, straining the tea from the tea liquor, adding sugar to the second tea liquor to form a second mixture that will serve as a second aerobic nutrient solution for aerobic fermentation, diluting the second mixture, cooling the second mixture, inoculating the second mixture with a symbiotic culture of bacteria and yeast ("SCOBY") to begin fermentation, and aerobically fermenting the second mixture, wherein the second fermented tea solution includes live probiotic colonies; and
  mixing the secondary brew and second fermented tea solution together to form the fermented alcoholic beverage, wherein the fermented alcoholic beverage includes active probiotic colonies and an ABV of approximately 3% to 7%.

WO 2014/000746 describes a method of preparing a beverage, wherein the method comprises the steps of a) providing a starting liquid comprising at least one micro-nutrient and at least one sugar; and
  b) incubating said liquid with
    (i) one or more glucose fermenting microorganisms and/or
    (ii) with an enzyme or a mixture of enzymes capable of catalyzing conversion of glucose to form an organic acid and/or
    (iii) with one or more glucose fermenting microorganisms capable of fermenting glucose to an organic acid and/or
    (iv) with an enzyme or a mixture of enzymes capable of catalyzing conversion of sugar to form an organic acid; and
  c) removing at least 10% of one or more acidic ions from said liquid while retaining at least 65% of said at least one micro-nutrient in said liquid, thereby obtaining an AX-REED liquid, wherein said acidic ion is removed through an Anion Exchange Reverse Electro-Enhanced Dialysis (AX-REED) membrane stack.

JP 2011 217706 describes the use of a gluconate component selected from gluconic acid, gluconate, glucono delta-lactone to improve the taste of a non-alcoholic beverage with a beer-like taste.

US 2007/116801 describes a process for the production of a low-alcohol or alcohol-free beer comprising:

producing a wort by mixing brewing water, hops and a carbohydrate source;

boiling the wort;

subjecting the wort to a fermentation using at least one microorganism selected from the group consisting of *Saccharomyces diasialicus* and *Brellanomyces intermedius;* wherein palatinose (isomaltulose) is added before, during or after the fermentation.

The US patent application mentions an embodiment in which the process comprises fermentation with an acid-forming bacterium selected from the group consisting of representatives of *Lactobacillus* sp., *Acetobacter* sp., and *Gluconobacter* sp.

The Brainer Vejr™ is a Slovakian alcohol-free beer that comprises caffeine, taurine and glucono delta-lactone.

Bionade® is a non-alcoholic fermented and carbonated beverage that is currently commercially available in several European countries. All flavours of Bionade® contain water, sugar, malt from barley, carbon acid, calcium carbonate and magnesium carbonate. The production of Bionade® includes a fermentation step with a strain of bacteria capable of converting sugar into gluconic acid. Bionade® contains about 1 wt. % gluconic acid.

Although the quality of low alcohol beers has improved substantially over the years, most beer consumers still prefer the taste of alcoholic beers. This means that there is still a need to improve the taste of low alcohol beers.

SUMMARY OF THE INVENTION

The inventors have discovered that low alcohol beers having an excellent taste can be obtained by a method that comprises in situ fermentative production of gluconate component selected from gluconic acid, gluconate, glucono delta-lactone and combinations thereof. The inventors have further found that such an excellent tasting low alcohol beer can be produced in a reproducible manner (i) by subjecting boiled wort to two successive fermentation steps, starting with a fermentation step that generates the gluconate component, followed by a yeast fermentation; or (ii) by subjecting a first boiled wort to yeast fermentation to produce the yeast fermented wort; subjecting a second boiled wort to another fermentation step to generate the gluconate component and to produce a second fermented wort; and combining the yeast fermented wort and the second fermented wort.

Accordingly one aspect of the invention relates to a method of preparing a beer having an ethanol content of 0-3.0% ABV, said method comprising:

mashing a mixture comprising malted barley, optionally adjuncts, and water to produce a mash comprising brewing sugars selected from glucose, maltose, maltotriose, sucrose, fructose and combinations thereof;

separating the mash in wort and spent grains;

boiling the wort to produce a boiled wort;

subjecting the boiled wort to a fermentation with live yeast to produce a yeast fermented wort;

wherein the method comprises in situ fermentative production of gluconate component selected from gluconic acid, gluconate, glucono delta-lactone and combinations thereof by;

(a) subjecting the boiled wort to two successive fermentation steps, starting with a fermentation step that generates the gluconate component, followed by the yeast fermentation; or (b) subjecting a first boiled wort to yeast fermentation to produce the yeast fermented wort;

subjecting a second boiled wort to another fermentation step to generate the gluconate component and to produce a second fermented wort; and combining the yeast fermented wort and the second fermented wort.

It was unexpectedly found that the present method yields low alcohol beers having a more complex and 'rounded' flavour. Fermentative production of the gluconate component offers the advantage that a very pleasant flavour profile is produced. This very pleasant flavour profile is believed to be the result of the microbial production of flavour components and/or digestion of less desirable flavour components, e.g. flavour compounds giving rise to so called 'worty flavour'. Furthermore, it was found that the fermentation production of gluconate component is associated with a reduction of undesirable bitter notes.

Since in the present method the fermentation with yeast and the fermentation producing gluconate component have been decoupled, these fermentation steps can be separately optimized and controlled, resulting in a higher quality beer and/or less fluctuations in product quality. Furthermore, competition between the micro-organisms employed in these two fermentation steps is effectively avoided.

Another aspect of the invention relates to a beer having an ethanol content of 0-3.0% ABV, said beer comprising:

0-6 wt. % of brewing sugars selected from glucose, fructose, maltose, sucrose, maltotriose and combinations thereof;

0.5-100 mmol/L of gluconate component selected from gluconic acid, gluconate, glucono delta-lactone and combinations thereof;

0-500 mg/L palatinose.

DETAILED DESCRIPTION OF THE INVENTION

Accordingly, a first aspect of the invention relates to a method of preparing a beer having an ethanol content of 0-3.0% ABV, said method comprising:

mashing a mixture comprising malted barley, optionally adjuncts, and water to produce a mash comprising brewing sugars selected from glucose, maltose, maltotriose, sucrose, fructose and combinations thereof;

separating the mash in wort and spent grains;

boiling the wort to produce a boiled wort;

subjecting the boiled wort to a fermentation with live yeast to produce a yeast fermented wort;

wherein the method comprises in situ fermentative production of gluconate component selected from gluconic acid, gluconate, glucono delta-lactone and combinations thereof by;

(a) subjecting the boiled wort to two successive fermentation steps, starting with a fermentation step that generates the gluconate component, followed by the yeast fermentation; or (b) subjecting a first boiled wort to yeast fermentation to produce the yeast fermented wort; subjecting a second boiled wort to another fermentation step to generate the gluconate component and to produce a second fermented wort; and combining the yeast fermented wort and the second fermented wort.

The term "beer" as used herein refers to a yeast fermented malt beverage that has optionally been hopped. Beer is commonly produced by a process that comprises the following basic steps:

mashing a mixture comprising malted barley, optionally adjuncts and water to produce a mash;

separating the mash in wort and spent grains;

boiling the wort to produce a boiled wort;

fermenting the boiled wort with live yeast to produce a fermented wort;

subjecting the fermented wort to one or more further process steps (e.g. maturation and filtration) to produce beer; and packaging the beer in a sealed container, e.g. a bottle, can or keg.

The term "alcohol" as used herein, unless indicated otherwise, is synonymous with "ethanol".

The term "low alcohol" as used herein, unless indicated otherwise, means an alcohol content of between 0 and 3.0% alcohol by volume (ABV).

The term "alcohol-free" as used herein means an alcohol content of between 0 and 0.1% ABV.

The term "gluconic acid" as used herein refers to (2R, 3S,4R,5R)-2,3,4,5,6-pentahydroxyhexanoic acid.

The term "gluconate" as used herein refers to salts of gluconic acid and to dissociated forms of these salts and of gluconic acid.

The term "glucono delta-lactone" as used herein refers to (3R,4S,5S,6R)-3,4,5-trihydroxy-6-(hydroxymethyl)tetrahydro-2H-pyran-2-one. Glucono delta-lactone is a neutral cyclic ester of gluconic acid, which can be produced by fermentation. When added into an aqueous solution, glucono delta-lactone dissolves, and subsequently at least partially hydrolyses to gluconic acid.

The term "fermentation" as used herein refers to a process in which the activity of micro-organisms results in the formation of a substance such as, for example, ethanol or gluconic acid. The fermentation may occur under aerobic as well as non-aerobic conditions.

The term "sucrose equivalent" as used herein refers to a comparison between the sweetness of a substance or combination of substances and the sweetness of sucrose. For example, a sucrose equivalent of 5% relates to an overall sweetness similar to the sweetness of a solution having 5% by weight of sucrose.

The term "adjunct" as used herein refers to unmalted grains (e.g. corn, rice, rye, oats, barley and wheat), starch, maltodextrin and fermentable sugars (e.g. sucrose or glucose).

The term "iso-alpha acids" as used herein refers to substances selected from the group of isohumulone, isoadhumulone, isocohumulone, pre-isohumulone, post-isohumulone and combinations thereof. The term "iso-alpha acids" encompasses different stereo-isomers (cis-iso-alpha acids and trans-iso-alpha acids). Iso-alpha acids are typically produced in beer from the addition of hops to the boiling wort. They may also be introduced into the beer in the form of pre-isomerised hop extract.

The term "hydrogenated iso-alpha acids" refers to substances selected from dihydro-iso-alpha acids, tetrahydro-isoalpha acids, hexahydro-iso-alpha acid and combinations thereof.

The term "hulupones" as used herein refers to substances selected from cohulupone, n-hulupone, adhulupone and combinations thereof. Hulupones are oxidation products of hop beta-acids.

The term "free amino nitrogen" as used herein refers to the combined concentration of individual amino acids and small peptides as determined by EBC method 9.10.1—Free Amino Nitrogen in Beer by Spectrophotometry (IM).

The term "a" or "an" as used herein is defined as "at least one" unless specified otherwise. When referring to a noun (e.g. a compound, an additive, etc.) in the singular, the plural is meant to be included. The term "or" as used herein is to be understood as "and/or".

The boiled wort that is employed in the present method preferably has an original extract of 2-23° P, more preferably of 3-18° P and most preferably of 5-10° P.

In order to reach an optimum acid pH, some acidulant other than the gluconate component may be added or may be formed in situ, e.g. by fermentation. Examples of suitable acidulants include lactic acid, citric acid, phosphoric acid, malic acid, succinic acid, acetic acid, ascorbic acid, tartaric acid, carbonic acid and combinations thereof.

In the present method, the separated wort preferably contains at least 1 wt. % glucose, calculated by weight of dry matter. More preferably, the wort contains, calculated by weight of dry matter, 5-50 wt. % glucose, more preferably 8-30 wt. % glucose.

Typically, the glucose content of the separated wort is in the range of 0.2-20 wt. %, more preferably 0.4-10 wt. % and most preferably 1-5 wt. %.

The total amount of gluconate component that is formed in situ in the present method preferably is in the range of 0.5-100 mmol/L, more preferably 1-50 mmol/L, even more preferably 1.2-25 mmol/L, yet more preferably 1.5-15 mmol/L and most preferably 2-10 mmol/L of the final beer.

In situ fermentative production of the gluconate component may suitably occur within the mash or within the wort (before or after wort boiling). Preferably, the fermentative production of the gluconate component occurs within the wort, most preferably the boiled wort. Any microorganism capable of producing the gluconate component may be applied in the present method for the in situ_production of the gluconate component. For example, *Aspergillus niger, Aureobasidium pullulans*, or a bacterium of the family Acetobacteraceae such as those belonging to the genera *Acetobacter, Gluconobacter, Gluconoacetobacter* and *Komagateibacter* may be applied.

Preferably, the gluconate component is produced in situ by bacterial fermentation. More preferably, the bacterial fermentation is carried out using one or more of the following micro-organisms: *Acetobacter, Gluconoacetobacter* or *Komagateibacter*. Even more preferably, the fermentation is carried out using *Gluconobacter*, most preferably *Gluconobacter oxydans*.

Fermentative production of the gluconate component preferably occurs after the wort boiling and before the yeast fermentation. Preferably, the present method comprises inoculation of the boiled wort with at least $5 \times 10^4$ CFU/mL, more preferably $10^5$-$10^8$ CFU/mL and most preferably $5 \times 10^5$-$5 \times 10^7$ CFU/mL of a micro-organism selected from *Aspergillus niger, Aureobasidium pullulans* or a bacterium of the family Acetobacteraceae, more preferably of a bacterium belonging to the genera *Acetobacter, Gluconobacter, Gluconoacetobacter* and *Komagateibacter*, even more preferably of *Gluconobacter*, and most preferably of *Gluconobacter oxydans*.

Preferably, the present method does not comprise addition of palatinose or it comprises addition of palatinose in an amount of not more than 500 mg/L. More preferably, the method does not comprise addition of palatinose or it comprises addition of palatinose in an amount of not more than 50 mg/L. Even more preferably, the method does not comprise addition of palatinose or it comprises addition of palatinose in an amount of not more than 5 mg/L. Most preferably, the method does not comprise addition of palatinose If caffeine is added in the present process, it is preferably added before the fermentation step.

Preferably, the present method does not comprise addition of caffeine or it comprises addition of caffeine in an amount of not more than 100 mg/L. More preferably, the method does not comprise addition of caffeine or it comprises addition of caffeine in an amount of not more than 10 mg/L. Even more preferably, the method does not comprise addition of caffeine or it comprises addition of caffeine in an amount of not more than 1 mg/L. Most preferably, the method does not comprise addition of caffeine.

If taurine is added in the present process, it is preferably added before the fermentation step.

Preferably, the present method does not comprise addition of taurine or it comprises addition of taurine in an amount of not more than 100 mg/L. More preferably, the method does not comprise addition of taurine or it comprises addition of taurine in an amount of not more than 10 mg/L. Even more preferably, the method does not comprise addition of taurine or it comprises addition of taurine in an amount of not more than 3 mg/L. Most preferably, the method does not comprise addition of taurine or it comprises addition of taurine in an amount of not more than 1 mg/L.

In situ fermentative production of the gluconate component in accordance with the present invention can be achieved in two different ways:

1) Sequential fermentations: the boiled wort is subjected to two successive fermentation steps, starting with a first fermentation step that generates the gluconate component, followed by the yeast fermentation;
2) Separate fermentations: a first boiled wort is subjected to yeast fermentation to produce the yeast fermented wort; a second boiled wort is subjected to another fermentation step to generate the gluconate component and to produce a second fermented wort; the yeast fermented wort and the second fermented wort are combined to produce a fermented wort that contains the gluconate component.

The boiled wort that is subjected to yeast fermentation in accordance with the above embodiments 1) and 2) preferably contains, calculated by weight of dry matter. at least 1 wt. % glucose, more preferably 5-50 wt. % glucose, most preferably 8-30 wt. % glucose. Expressed differently, the glucose content of the boiled wort is in the range of 0.2-20 wt. %, more preferably 0.4-10 wt. % and most preferably 1-5 wt. %.

In embodiment 1), preferably non-fermented boiled wort is added after the first fermentation step and before the yeast fermentation. More preferably, the volume of non-fermented boiled wort that is added after the first fermentation step is equal or up to 20 times larger than the volume of boiled wort that is fermented in the first step. Even more preferably, the volume of non-frermented boiled wort that is added after the first fermentation is 3-12 times larger than the volume of boiled wort that is fermented in the first step.

In embodiment 1), the first fermentation step typically yields a fermented wort containing at least 1 mmol/L, more preferably 2-150 mmol/L and most preferably 3-100 mmol/L of the gluconate component.

In the method according to embodiment 1), it is preferred to employ a non-hopped boiled wort in the first fermentation step and to add (i) hops or hops extract or (ii) hopped boiled wort after the fermentation that generates the gluconate component. This is because hops and hops extract have antimicrobial activity that can be detrimental to the activity of micro-organisms that are capable of producing the gluconate component.

In case the present method employs separate fermentations in accordance with embodiment 2), the second boiled wort preferably contains, calculated by weight of dry matter, at least 1 wt. % glucose, more preferably 5-50 wt. % glucose, most preferably 8-30 wt. % glucose. Expressed differently, the glucose content of the second boiled wort is in the range of 0.2-20 wt. %, more preferably 0.4-10 wt. % and most preferably 1-5 wt. %.

In embodiment 2), fermentation of the second boiled wort typically yields a second fermented wort containing at least 1 mmol/L, more preferably 2-150 mmol/L and most preferably 3-100 mmol/L of the gluconate component.

In the method according to embodiment 2), the first boiled wort preferably is a hopped boiled wort and the second boiled wort is a non-hopped boiled wort.

In embodiment 2), the yeast fermented wort and the second fermented wort are typically combined in a weight ratio of 0.5:1 to 20:1, more preferably in a weight ratio of 1:1 to 10:1, and most preferably in a weight ratio of 1.5:1 to 8:1.

Preferably, the fermentative production of the gluconate component is carried out under aerobic conditions.

The temperature at which the fermentative production of the gluconate component is carried out is preferably in the range of 10 to 37° C., more preferably in the range of 15 to 30° C.

The yeast fermentation step in the present method may be carried out under conditions that favour the fermentative production of ethanol (alcoholic fermentation) or under conditions that minimize the fermentative production of ethanol (alcohol restricted fermentation). Preferably, the yeast fermentation step is an alcohol restricted fermentation.

In one embodiment of the present method the yeast fermentation employed is an alcoholic fermentation and the yeast fermented wort produced has an ethanol content of 3-12.0% ABV, more preferably 4-10% ABV, most preferably 5-8% ABV. Following yeast fermentation, the yeast fermented wort is dealcoholized to reduce the ethanol content to less than 3.0%

ABV, more preferably to 0.2-2.2% ABV and most preferably 0.3-1.5% ABV.

In case the present method employs a sequential fermentation according to embodiment 2) described above, de-alcoholisation may be performed on the yeast fermented wort or on the combination of yeast fermented wort and the second fermented wort. Preferably, the yeast fermented wort is de-alcoholised before it is combined with the second fermented wort.

De-alcoholisation is preferably carried out by means of distillation or by membrane separation (e.g. nanofiltration, reverse osmosis, osmotic distillation, dialysis or pervaporation). Most preferably, dealcoholisation is carried by means of distillation.

Preferably, de-alcoholisation by distillation is carried out at a temperature in the range of 10-100° C., more preferably in the range of 20-65° C., even more preferably in the range of 30-50° C., and most preferably in the range of 40-46° C.

De-alcoholisation by distillation is preferably carried out at a pressure in the range of 0.01-500 mbar, more preferably in the range of 1-200 mbar, even more preferably in the range of 5-150 mbar and most preferably in the range of 80-110 mbar.

According to an alternative embodiment the yeast fermentation employed is an alcohol restricted fermentation that yields a yeast fermented wort having an ethanol content of 0-3% ABV. In case the yeast fermented wort has an ethanol content of more than 3.0% ABV, ethanol content is reduced to 3.0% ABV or lower by dilution.

In alcohol restricted fermentation ethanol production is minimised by (i) employing a yeast that has limited capability of converting sugars (notably glucose and/or maltose) into ethanol and/or (ii) using a wort that contains a limited amount of sugars (notably glucose and/or maltose) that can be converted into ethanol by the yeast and/or (iii) employing fermentation conditions (e.g. low temperature) at which the yeast's capability of converting sugars into ethanol is impaired.

In one embodiment, the alcohol restricted fermentation employs a yeast that has limited capability of digesting glucose, maltose or maltotriose. Suitable examples of such yeasts are maltose-negative yeast and crabtree-negative yeast.

In another embodiment, the alcohol restricted fermentation uses a wort that contains a limited amount of sugars that can be digested by the yeast to produce ethanol. Preferably such a wort is produced by employing mashing conditions that yields a separated wort with the following composition, calculated by weight of dry matter:

15-40 wt. % of brewing sugars selected from glucose, maltose, maltotriose, sucrose, fructose and combinations thereof; and 20-50 wt. % malto-oligosaccharides selected from malto-tetraose, maltopentaose, maltohexaose, maltoheptaose and combinations thereof;

Such a wort may be produced by ending the mashing step before the malto-oligosaccharide have largely been converted into fermentable sugars.

In yet another embodiment, the alcohol restricted fermentation employs fermentation conditions that impair the yeast's capability of converting sugars. Cold contact fermentation is a preferred type of alcohol restricted fermentation in which ethanol production is minimized by carrying out yeast fermentation at low temperature.

Cold-contact fermentation is preferably carried out at a temperature below 7° C., more preferably at −1 to 4° C., more preferably at −0.5 to 2.5° C. for a period of preferably 8-72 hours, more preferably a period of 12-48 hrs to produce a yeast fermented wort having an ethanol content of 0-3% ABV. In case the yeast fermented wort has an ethanol content of more than 3.0% ABV, ethanol content is reduced to 3.0% ABV or lower by dilution.

Advantageously the present method comprises the addition of hops and/or hop extract. As explained herein before, the hop acids contained in hops and hop extract impart desirable bitterness and floral, fruity flavor notes to the final beer.

Preferably, the method according to the invention does not include the removal or organic acid through anion exchange reverse electro-enhanced dialysis.

According to a particularly preferred embodiment, the present method yields a beer as described below.

Another aspect of the invention relates to a beer having an ethanol content of 0-3.0% ABV, said beer comprising:

0-6 wt. %, preferably 0.3-6 wt. % of brewing sugars selected from glucose, fructose, maltose, sucrose, maltotriose and combinations thereof; and 0.5-100 mmol/L of gluconate component selected from gluconic acid, gluconate, glucono delta-lactone and combinations thereof.

The beer of the present invention preferably contains 1-50 mmol/L, more preferably 1.2-25 mmol/L, even more preferably 1.5-15 mmol/L and most preferably 2-10 mmol/L of gluconate component selected from gluconic acid, gluconate, glucono delta-lactone and combinations thereof.

Preferably, the beer contains less than 50 mg/L, more preferably less than 5 mg/L and most preferably no palatinose.

The beer of the present invention preferably has an energy value of less than 50 kcal/100 mL, more preferably an energy value of 5-40 kcal/100 mL and most preferably an energy value of 10-32 kcal/100 mL.

Preferably, the beer contains less than 500 mg/L, more preferably less than 200 mg/L, even more preferably less than 50 mg/L and most preferably no polydextrose.

Preferably, the beer contains less than 100 mg/L, more preferably less than 10 mg/L, even more preferably less than 1 mg/L and most preferably no caffeine.

Preferably, the beer contains less than 100 mg/L, more preferably less than 10 mg/L, even more preferably less than 3 mg/L and most preferably 0-1 mg/I taurine.

The beer preferably has a real extract of 1-10° P, more preferably of 1.5-8° P and most preferably of 2-6° P.

As explained herein before, the benefits of the present invention are particularly appreciated in low alcohol beers having a sweet flavour note. According to a particularly preferred embodiment, the low alcohol beer of the present invention has a sweetness of 0.5-3% sucrose equivalent, wherein the sweetness of the beer is calculated as follows:

0.7×[glucose]+1.5×[fructose]+0.4×[maltose]+1×[sucrose]+0.2×[maltotriose];

wherein [carbohydrate] represents the concentration of the carbohydrate in wt. %.

More preferably the beer has a sweetness of 0.6-2.5% sucrose equivalent, more preferably of 0.7-2% sucrose equivalent.

The inventors have found that the beneficial effect of gluconate component is particularly appreciated if the beer has a pH in the range of 3.5 to 5.0. More preferably, the beer has a pH in the range of 3.6 to 4.5, most preferably the beer has a pH in the range of 3.7 to 4.3. The pH of the beer is measured after degassing at a temperature of 20° C.

The mashing conditions, the adjuncts and yeast fermentation conditions employed in the preparation of the low alcohol beer of the present invention affect the carbohydrate composition of the beer. During the mashing, starch is hydrolysed and the sugars glucose, maltose and maltotriose are formed. Adjuncts may provide additional starch and starch hydrolysis products, but also sucrose and/or fructose. These brewing sugars (glucose, maltose, maltotriose, sucrose, fructose) may be partially or fully digested during yeast fermentation. It the brewing sugars are fully digested during fermentation, brewing sugars are added after fermentation to achieve the minimum concentration required by the present invention.

According to a particularly preferred embodiment, the brewing sugars are contained in the beer in a concentration of 0.4-5 wt. %, more preferably 0.5-4 wt. %, most preferably 1.0-3 wt. %.

Besides glucose, maltose and maltotriose, the mashing typically also produces starch hydrolysis products in the form of oligosaccharides. Preferably, the low alcohol beer contains 0.1-1 wt. % of malto-oligosaccharides selected from maltotetraose, maltopentaose, maltohexaose, maltoheptaose and combinations thereof. More preferably, the beer comprises 0.2-0.7 wt. %, most preferably 0.3-0.6 wt. % of said malto-oligosaccharides.

Maltotetraose is preferably contained in the beer in a concentration of 0.04-0.8 wt. %, more preferably 0.06-0.6 wt. %, most preferably 0.08-0.4 wt. %.

The low alcohol beer of the present invention preferably contains 0-2 wt. %, more preferably 0-1.5 wt. %, most preferably 0-1.0 wt. % glucose.

Preferably the low alcohol beer contains 0-5 wt. %, more preferably 0-4 wt. %, most preferably 0-3.5 wt. % maltose.

Preferably the low alcohol beer contains 0-2 wt. %, more preferably 0-1.5 wt. %, most preferably 0-1.0 wt. % maltotriose.

Preferably the combination of glucose, maltose and maltotriose is contained in the low alcohol beer in a concentration of 1-5 wt. %, more preferably in a concentration of 1.5-4.5 wt. %, most preferably, in a concentration of 2-4 wt. %.

The low alcohol beer contains preferably 0-0.5 wt. %, more preferably 0.0-0.3 wt. %, most preferably 0.0-0.1 wt. % fructose.

The low alcohol beer contains preferably 0-0.5 wt. %, more preferably 0.0-0.3 wt. %, most preferably 0.0-0.1 wt. % sucrose.

The low alcohol beer of the present invention that has been produced by alcoholic fermentation typically contains no more than a small amount of the brewing sugars. Accordingly, the low alcohol beer according to this embodiment of the invention preferably contains 0.3-3.5 wt. %, more preferably 0.5-3 wt. %, most preferably 1-2.5 wt. % of the brewing sugars.

The low alcohol beer of the present invention may be prepared using different types of yeast fermentation. One option is to carry out the yeast fermentation under conditions that favour the fermentative production of ethanol (alcoholic fermentation) and to remove ethanol after fermentation. Another option is to carry out the yeast fermentation under conditions that minimize the fermentative production of ethanol (alcohol restricted fermentation).

During alcoholic fermentation, the aforementioned brewing sugars are digested by the yeast and ethanol is produced by the same yeast. If alcoholic fermentation is used in the production of a low alcohol beer, ethanol must be removed after fermentation or the fermentation product must be diluted if the ethanol content after fermentation exceeds the maximum amount required by the present invention.

Alcohol restricted fermentation can be carried out in different ways. Conversion of the brewing sugars to ethanol may be minimized and/or a wort may be employed that contains a reduced amount of the brewing sugars. The low alcohol beer of the present invention that is produced by alcohol restricted fermentation preferably contains the brewing sugars in a concentration of 1.5-6 wt. %, more preferably of 1.8-5 wt. %, most preferably of 2-4 wt. %.

The low alcohol beer of the present invention may suitably be produced from a wort that contains only a limited amount of brewing sugars. Such a wort can be obtained by partial hydrolysis of the starch during the mashing step. The low alcohol beer obtained in this manner typically contains 0.4-3 wt. %, preferably 0.6-2.5 wt. % and most preferably 0.8-2 wt. % of malto-oligosaccharides selected from maltotetraose, maltopentaose, maltohexaose, maltoheptaose and combinations thereof.

In another embodiment of the present invention, the low alcohol beer is prepared by fermentation with a live yeast that is unable digest one or more of the brewing sugars, especially a yeast that is unable to digest glucose, maltose and/or maltotriose. In a preferred embodiment, the low alcohol beer is prepared by fermentation with a maltose negative yeast. The low alcohol beer that has been produced using maltose-negative yeast typically contains glucose and maltose in a weight ratio of less than 1:5, more preferably less than 1:10, most preferably, less than 1:100.

In an alternative embodiment, the low alcohol beer is prepared by fermentation with a glucose negative yeast or by a 'stopped fermentation'. The low alcohol beer that has been produced in this manner typically contains maltose and glucose in a weight ratio of less than 1:5, more preferably less than 1:10, most preferably, less than 1:100.

Hop acids such as iso-alpha acids, as well as hydrogenated iso-alpha acids and oxidised alpha-acids (hulupones) contribute to the pleasant bitterness of beers that is appreciated by consumers. Accordingly, the beer advantageously contains hop acids. Preferably, the beer contains 2-100 mg/L, more preferably 4-60 mg/L, most preferably 8-40 mg/L of hop acids selected from iso-alpha acids, hydrogenated iso-alpha acids, hulupones and combinations thereof.

Riboflavin, free fatty acids (e.g. linoleic acid), amino acids and small peptides are substances that are naturally present in malted barley and that typically occur in significant concentrations in low alcohol beer.

The riboflavin content of the low alcohol beer is preferably in the range of 40-1,000 μg/L more preferably 60-800 μg/L and most preferably 100-600 μg/L.

The low alcohol beer preferably contain 20-1,500 μg/L, more preferably 40-1,200 μg/L and most preferably 50-800 μg/L of linoleic acid.

The free amino nitrogen (FAN) content of the low alcohol beer is preferably in the range of 8-400 mg/L more preferably 12-300 mg/L, most preferably 20-250 mg/L.

Preferably, the beer according to the invention does not contain fermented or non-fermented tea extract, such as Kombucha.

The beer of the present invention may be an alcohol-free beer or a beer having a low alcohol content. The benefits of the present invention are particularly appreciated in beer that contains at least 0.2% ABV alcohol. According to a particularly preferred embodiment of the invention, the beer is an alcoholic beer having a low ethanol content of 0.2-3.0% ABV, more preferably of 0.3-2.2% ABV, most preferably of 0.4-1.5% ABV.

The low alcohol beer of the present invention preferably contains less than 100 CFUs, more preferably less than 10 CFUs and most preferably less than 1 CFU of *Aspergillus niger, Aureobasidium pullulans, Acetobacter* and *Gluconobacter* per 100 ml.

According to a further preferred embodiment, the low alcohol beer of the present invention contains DNA originating from *Aspergillus niger, Aureobasidium pullulans* or a bacterium of the family Acetobacteraceae, such as those belonging to the genera *Acetobacter, Gluconobacter, Gluconoacetobacter* and *Komagateibacter*. Most preferably, the low alcohol beer of the present invention contains DNA of a bacterium belonging to the genus *Gluconobacter*, most preferably *Gluconobacter oxydans*. The presence of microbial DNA in the low alcohol beer may be established using polymerase chain reaction (PCR) and sequencing.

Yet another aspect of the invention concerns the use of gluconate component selected from gluconic acid, gluconate, glucono delta-lactone and combinations thereof to improve the taste of beer having an alcohol content of 0-3.0% ABV, preferably of 0.2-3.0% ABV, more preferably of 0.3-2.2% ABV, most preferably of 0.4-1.5% ABV. The aforementioned use preferably comprises addition of the gluconate component and/or in situ fermentative production of the gluconate component.

The total amount of gluconate component that is added and/or that is formed in situ preferably is in the range of 0.5-100 mmol/L, more preferably 1-50 mmol/L, even more preferably 1.2-25 mmol/L and most preferably 1.5-15 mmol/L of the final beer.

The invention is further illustrated by the following non-limiting examples.

EXAMPLES

Example 1

A full malt alcoholic lager beer (5.0% ABV) and an alcohol-free full malt lager beer were mixed in a weight ratio 1:9 to obtain a 0.5% ABV lager beer. This lager beer had a pH of 4.5. The pH was titrated with acid to a pH of 3.8, either with a 50% gluconic acid solution, or with a 30% lactic acid solution. In this way, two beers were obtained:

Beer A: 0.5% ABV, pH 3.8, gluconic acid

Beer B: 0.5% ABV, ph 3.8, lactic acid

The beers were evaluated by trained tasters. Beer A, containing the added gluconic acid, was preferred over beer B, containing the added lactic acid. Beer A was perceived as a more balanced, complex beer with a smooth longer lasting aftertaste. In contrast, beer B was perceived as slightly more bitter, less balanced and with a sharper but shorter lasting aftertaste.

Example 2

A 17° P hopped wort with a bitterness of 26 BU, was fermented with a maltose negative yeast to produce a yeast fermented wort (1% ABV). A second 17° P hopped wort with a bitterness of 26 BU, was fermented under aerobic conditions with *Acetobacter orleansis* to produce a "sour" wort. The sour wort (0.0% ABV) had a gluconic acid concentration of 6 g/l and a strongly reduced bitterness of 5.14 BU.

The beer and the sour wort were combined in a 1:1 weight ratio to obtain a Beer A.

A second beer, Beer B, was obtained by mixing the yeast fermented wort with a 0.0% ABV full malt lager beer in a weight ratio 1:1. Gluconic acid was added to a concentration of 3 g/L.

The beers were evaluated by trained tasters. Beer A, containing the in-situ produced gluconic acid, was preferred over beer B, containing the added gluconic acid. Beer A was perceived as a fresh, balanced, complex beer with a significantly reduced bitter taste. In contrast, beer B was perceived as a less complex beer with a pronounced bitter taste.

Example 3

A first fermented wort is produced by mashing a mixture of grain and water to produce a mash;

separating the mash in wort and spent grain;

boiling the wort in the presence of hops;

subjecting the boiled wort to a cold contact fermentation, followed by maturation and filtration.

The first fermented wort so obtained has an alcohol content of less than 0.1% ABV.

Gluconic acid (50% gluconic acid solution) is admixed to part of the first fermented wort and a beer is produced by carbonising to approximately 5 g/L $CO_2$. The beer so obtained is filtrated over a membrane, and diluted with water to produce an alcohol-free "Beer A" having a real extract of 6° P and a gluconate content of 5 mmol/L.

A second fermented wort is produced by mashing a mixture of grain and water to produce a mash;

separating the mash in wort and spent grain; boiling the wort;

fermenting the boiled wort with live bacteria of *Gluconobacter oxydans* under aerobic conditions; and subjecting the fermented wort to maturation and filtration.

Next, the first fermented wort and the second fermented wort are mixed in a weight ratio of 7:1 and the resulting mixture is carbonized to approximately 5 g/L $CO_2$. The beer so obtained is filtrated over a membrane and diluted with water to produce an alcohol-free "Beer B" having a real extract of 6° P and a gluconate content of 5 mmol/L.

The alcohol-free Beer A and the alcohol-free Beer B are compared in a blind tasting session by an expert panel. Beer B is clearly preferred by the panel over Beer A.

The invention claimed is:

1. A beer having an ethanol content of 0-3.0% ABV, comprising:

(a) 1-6 wt. % of brewing sugars selected from glucose, fructose, maltose, sucrose, maltotriose and combinations thereof;

(b) 2-100 mg/L of hop acids selected from iso-alpha acids, hydrogenated iso-alpha acids, hulupones and combinations thereof;

(c) 0.5-15 mmol/L of gluconate component selected from gluconic acid, gluconate, glucono delta-lactone and combinations thereof;

(d) 0-500 mg/L palatinose; and (e) 0-1 mg/L caffeine.

2. The beer according to claim 1, having a sweetness of 0.5-3% sucrose equivalent, wherein the sweetness of the beer is calculated as follows:

0.7×[glucose]+1.5×[fructose]+0.4×[maltose]+1×[sucrose]+0.2×[maltotriose];

wherein [carbohydrate] represents the concentration of the carbohydrate in wt. %.

3. The beer according to claim 1, having a pH in the range of 3.5 to 5.0.

4. The beer according to claim 1, having an ethanol content of 0.2-3.0% ABV.

5. The beer according to claim 1, comprising 0-2 wt. % glucose.

6. The beer according to claim 1, comprising 0-4 wt. % maltose.

7. The beer according to claim 1, comprising DNA originating from *Aspergillus niger, Aureobasidium pullulans* or a bacterium of the family Acetobacteraceae.

* * * * *